US008700753B2

(12) United States Patent
Bagsby

(10) Patent No.: US 8,700,753 B2
(45) Date of Patent: *Apr. 15, 2014

(54) DISTRIBUTED COMPUTER SYSTEM FOR TELECOMMUNICATIONS OPERATIONAL SUPPORT

(76) Inventor: Denis L. Bagsby, Waterloo, IL (US)

(*) Notice: Subject to any disclaimer, the term of this patent is extended or adjusted under 35 U.S.C. 154(b) by 3496 days.

This patent is subject to a terminal disclaimer.

(21) Appl. No.: 10/402,392

(22) Filed: Mar. 28, 2003

(65) Prior Publication Data

US 2005/0015771 A1 Jan. 20, 2005

(51) Int. Cl.
*G06F 15/173* (2006.01)
(52) U.S. Cl.
USPC .......................................... 709/223; 709/237
(58) Field of Classification Search
USPC .................. 709/201, 203, 220, 223, 249, 206
See application file for complete search history.

(56) References Cited

U.S. PATENT DOCUMENTS

| | | | |
|---|---|---|---|
| 5,566,235 A | 10/1996 | Hetz | |
| 5,802,159 A | 9/1998 | Smolentzov et al. | |
| 5,878,219 A | 3/1999 | Vance, Jr. et al. | |
| 5,917,898 A | 6/1999 | Bassa et al. | |
| 5,974,135 A | 10/1999 | Breneman et al. | |
| 6,012,050 A | 1/2000 | Eaton et al. | |
| 6,035,025 A | 3/2000 | Hanson | |
| 6,115,743 A * | 9/2000 | Cowan et al. | 709/224 |
| 6,198,811 B1 | 3/2001 | Klose et al. | |
| 6,249,578 B1 * | 6/2001 | Gilles et al. | 379/207.13 |
| 6,266,401 B1 * | 7/2001 | Marchbanks et al. | 379/116 |
| 6,314,172 B1 * | 11/2001 | Nightingale | 379/201.12 |
| 6,317,438 B1 * | 11/2001 | Trebes, Jr. | 370/466 |
| 6,434,514 B1 | 8/2002 | Chen et al. | |
| 6,487,285 B2 * | 11/2002 | Gilles et al. | 379/207.13 |
| 6,490,273 B1 | 12/2002 | DeNap et al. | |
| 6,519,606 B2 * | 2/2003 | Burton et al. | 1/1 |
| 6,523,027 B1 * | 2/2003 | Underwood | 1/1 |
| 6,532,465 B2 | 3/2003 | Hartley et al. | |
| 6,625,651 B1 | 9/2003 | Swartz et al. | |
| 6,687,351 B1 | 2/2004 | Antrim et al. | |
| 6,690,788 B1 | 2/2004 | Bauer et al. | |
| 6,771,758 B1 | 8/2004 | Sandel et al. | |
| 6,836,803 B1 | 12/2004 | Swartz et al. | |
| 6,868,441 B2 * | 3/2005 | Greene et al. | 709/220 |
| 6,889,249 B2 | 5/2005 | Miloushev et al. | |
| 6,950,935 B1 | 9/2005 | Allavarpu et al. | |
| 7,020,697 B1 * | 3/2006 | Goodman et al. | 709/223 |
| 7,143,420 B2 | 11/2006 | Radhakrishnan | |
| 7,225,249 B1 | 5/2007 | Barry et al. | |
| 7,239,877 B2 | 7/2007 | Corneille et al. | |
| 7,296,226 B2 | 11/2007 | Junkermann | |
| 7,299,478 B2 | 11/2007 | Bagsby | |
| 7,539,764 B2 | 5/2009 | Bagsby | |

(Continued)

OTHER PUBLICATIONS

Wikipedia Bus(computing), pp. 1-8, Oct. 24, 2012.*

(Continued)

*Primary Examiner* — Backhean Tiv
(74) *Attorney, Agent, or Firm* — Toler Law Group, PC

(57) ABSTRACT

In one particular embodiment, the disclosure is directed to a distributed computer system for use in connection with telecommunications operational support. The distributed computer system includes a common integration communications element, a telecommunication related business application, an adapter module, and an integrated services module. The adaptor module is coupled to the common integration communications element, and is responsive to the telecommunications related business application. The integrated services module is also coupled to the common integration communications element.

22 Claims, 14 Drawing Sheets

(56) References Cited

U.S. PATENT DOCUMENTS

| | | |
|---|---|---|
| 7,568,020 B2 | 7/2009 | Bagsby |
| 2002/0049608 A1* | 4/2002 | Hartsell et al. ............. 705/1 |
| 2002/0095400 A1* | 7/2002 | Johnson et al. ............. 707/1 |
| 2002/0147611 A1* | 10/2002 | Greene et al. ............. 705/1 |
| 2002/0165727 A1* | 11/2002 | Greene et al. ............. 705/1 |
| 2002/0165745 A1* | 11/2002 | Greene et al. ............. 705/7 |
| 2002/0169624 A1 | 11/2002 | Johnson |
| 2003/0061068 A1 | 3/2003 | Curtis |
| 2003/0074463 A1 | 4/2003 | Swartz et al. |
| 2003/0078962 A1 | 4/2003 | Fabbricatore et al. |
| 2003/0086536 A1 | 5/2003 | Salzberg et al. |
| 2003/0093575 A1 | 5/2003 | Upton |
| 2003/0105884 A1* | 6/2003 | Upton ............. 709/318 |
| 2003/0133552 A1 | 7/2003 | Pillai et al. |
| 2003/0202638 A1 | 10/2003 | Eringis et al. |
| 2003/0206620 A1 | 11/2003 | Taylor |
| 2004/0201611 A1 | 10/2004 | Bagsby |
| 2005/0015771 A1 | 1/2005 | Bagsby |
| 2005/0091663 A1 | 4/2005 | Bagsby |
| 2005/0240621 A1 | 10/2005 | Robertson et al. |
| 2006/0059107 A1 | 3/2006 | Elmore et al. |
| 2009/0259510 A1 | 10/2009 | Bagsby |

OTHER PUBLICATIONS

"Microsoft BizTalk for MQSeries White Paper", Microsoft Corporation, Jul. 2002.

"Using EDI with Microsoft BizTalk Server 2002", Microsoft Corporation, Feb. 2002.

Center for Advanced Software Systems Integration, printed from Ohio University website, dated Sep. 29, 2000.

* cited by examiner ial support.

DISTRIBUTED COMPUTER SYSTEM FOR TELECOMMUNICATIONS OPERATIONAL SUPPORT

TECHNICAL FIELD

This disclosure in general relates to a distributed computer system for use in connection with telecommunications operational support.

BACKGROUND

Changes in the laws relating to the telecommunications industry have required certain telephone companies to provide shared access to common telecommunications resources. Often, a single company manages these common telecommunications resources. As a result, this single company provides access to operational support systems to various competitors, customers, consumers, and vendors. However, the current operational support systems are often single-purpose, inflexible systems that are costly to maintain or enhance. In addition, many companies have multiple telecommunications resources supported by many different single-purpose systems for differing regions. Sharing these resources is complicated by the need to support multiple access protocols and diverse resource support systems. In one example, regional laws require that competitive local exchange carriers (CLEC) be given access to operational support systems managed by incumbent local exchange carriers (ILEC) to provide billing, fulfillment, and assurance support.

Sharing resources is further complicated by mergers and acquisitions of local exchange carriers. With a merger or acquisition, the surviving local exchange carrier faces the problem of supporting multiple diverse legacy systems performing similar functions, or investing considerable capital to replace or standardize the various operational support systems.

As such, many problems exist in providing access to operational support systems. Accordingly, there is a need for improved computer systems for telecommunications operational support.

SUMMARY

In one particular embodiment, the disclosure is directed to a distributed computer system for use in connection with telecommunications operational support. The distributed computer system includes a common integration communications element, a telecommunication related business application, an adapter module, and an integrated services module. The adaptor module is coupled to the common integration communications element, and is responsive to the telecommunications related business application. The integrated services module is also coupled to the common integration communications element.

In another embodiment, the disclosure is directed to an enterprise integration architecture. The enterprise integration architecture includes a plurality of user access elements, a distributed computing system infrastructure, a plurality of telecommunication related software application services, a plurality of telecommunication network computing resources, and an integration services platform. The distributed computing system infrastructure is responsive to each of the plurality of user access elements. The plurality of telecommunication related software application services are responsive to the distributed computing system infrastructure. The plurality of telecommunication network computing resources includes business management resources, operational support resources, and external enterprise communication resources. The integrated services platform provides a common service-oriented interface to the plurality of telecommunication related software application services. The integration services platform may also retrieve system specific data from the plurality of telecommunication network computing resources.

In a further embodiment, the disclosure is directed to a distributed computer system. The distributed computer system includes a plurality of customer channel access interfaces, an application services framework, a common integration services framework, and a distributed infrastructure system. The application services framework is coupled to the plurality of customer channel access interfaces and includes billing, fulfillment, and customer assurance functionality. The application services framework may have a distributed infrastructure interface. The common integration services framework includes a plurality of shared layered integration services. The common integration services framework may also have a distributed infrastructure interface. The distributed infrastructure system has a plurality of distributed network computing elements and is responsive to the distributed infrastructure interfaces.

In an additional embodiment, the disclosure is directed to a further distributed computing system. The distributed computing system includes a plurality of customer channel access interfaces, an application services framework, a common integration of services framework, a distributed infrastructure system, and a plurality of resource channels. The application services framework is coupled to the plurality of customer channel access interfaces. The application services framework includes billing, fulfillment, and customer assurance functionality and has a first distributed infrastructure interface. The common integration services framework includes a plurality of shared layer integration services and has a second distributed infrastructure interface. The distributed infrastructure system has a plurality of distributed network computing elements and is responsive to the first and second distributed infrastructure interfaces. The plurality of resource channels communicates with telecommunication network resources. These telecommunication network resources may be legacy systems having proprietary interfaces and adaptors to allow the legacy systems to be accessed by at least one resource channel.

In another embodiment, the disclosure is also directed to a method for integrating an information technology element associated with a telecommunications network system and a distributed computing system. The method includes the steps of attaching an adaptor component to the information technology element and, coupling the adaptor component to a resource channel of the distributed computing system. The resource channel is coupled to a distributed infrastructure system having a plurality of distributed network computing elements. The distributed infrastructure system supports an application services framework and a common integration services framework. The application services framework includes telecommunications billing, fulfillment and customer service functionality. The common integration services framework includes a plurality of shared integration services.

The disclosure is further directed to a distributed computer system including an interconnection service, a distributed communications infrastructure, an application service, and an integration service. The interconnection service is coupled to a plurality of access interfaces. The distributed communications infrastructure is coupled to the interconnection service.

The application service is coupled to the distributed communications infrastructure, and the application service includes billing, fulfillment and customer assurance functionality. The integration service is coupled to the distributed communications infrastructure and includes product management, customer information management, and service level agreement management functionality.

BRIEF DESCRIPTION OF THE DRAWINGS

The use of the same reference symbols in different drawings indicates similar or identical items.

DESCRIPTION OF THE DRAWINGS

An enterprise integration architecture system is described that enables a diverse set of access systems to communicate with a diverse set of resource systems through a common integrated system architecture. The enterprise integration architecture provides a common framework that can be leveraged when integrating a diverse set of telecommunications technologies and vendor equipment. Efficient and accurate data communications are provided using various exemplary embodiments of enterprise integration architectures, business integration services, adaptors, common integration busses, or common network resources.

Figure 1:
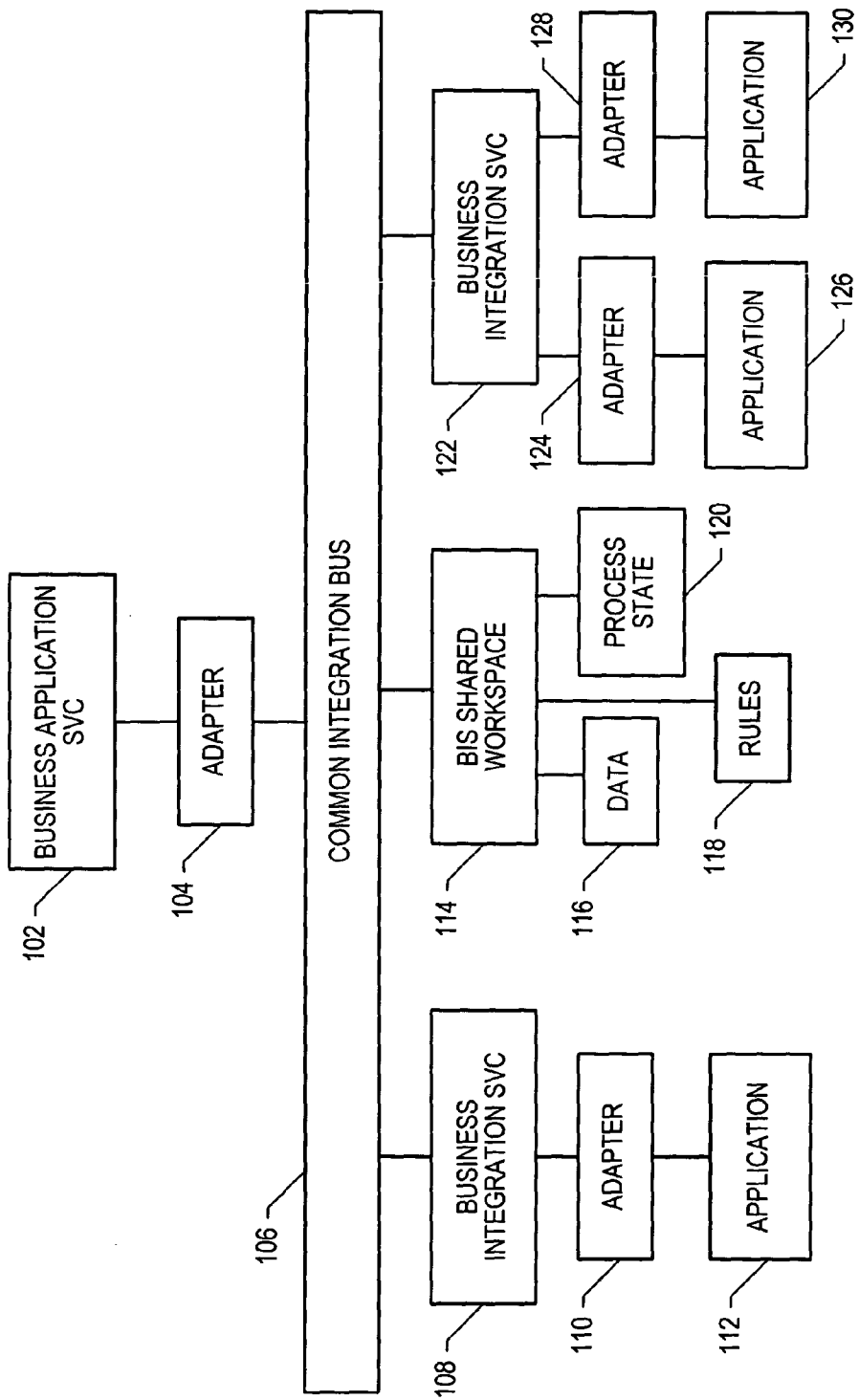
FIGS. 1, 2, 3 and 4 depict exemplary embodiments of an enterprise integration architecture.

FIG. 1 depicts a particular embodiment of an enterprise integration architecture. The architecture includes a business application service 102 in communication with a common integration bus 106 through an adaptor 104. In addition, a business integration service 108, a business integration service shared workspace 114, and a business integration service 122 are connected to the common integration bus 106.

The business application service 102 may take the form of one or more servers and may, for example, include client applications that request services of the business integration services 108 and 122, and the business integration service shared workspace 114. Users may use the business application service 102 to access various data and perform various functions associated with the business integration services tier including the business integration services 108 and 122, and the business integration service shared workspace 114. In turn, the business integration services 108 and 122 may access distributed resources through various applications 112, 126, and 130 and the business integration service shared workspace 114. The resource systems may include diverse and distributed operational support systems for local exchange carriers, vendors, competitors, trading partners, data storage systems, and other systems. In effect, the business integration service systems 108, 114, and 122 function to mediate the disparate data and functions resident in the resource systems by providing a consistent functional interface to client applications. The business integration service systems 108, 114, and 122 may provide additional functional capabilities not supported by the resource systems.

The business integration services 108 and 122 and the business integration services shared workspace 114 represent one or more server systems providing computing functions and data to the business application service 102 through the common integration bus 106 and adaptor 104. The business integration services 108 and 122 access one or more remote resource systems or applications 112, 126 and 130 through various adaptors 110, 124 and 128. The remote resources may include databases, usage systems, PREMIS systems, ASON systems, TIRKS® systems, Service Order Retrieval Distribution (SORD) systems, and CRIS systems. The business integration services 108 and 122 are organized to access such remote resources to acquire data or perform a requested function and to relay the data or result to the business application service 102. The business integration services 108 and 112 may perform functions such as product management, customer information management, order management, network resource management, service management, location information management, usage management, rating and pricing, bill preparation, and trouble administration.

For example, the business application service 102 may access data or functionality associated with the business integration service 108 through the adaptor 114 and communications integration bus 106. The business integration service 108 accesses a resource or application 112 through an adaptor 110 and provides data or function results to the business application service 102. As illustrated in connection with the business integration service 108, a single application 112 may be accessed through an adaptor 110. Alternately, one or more applications may be accessed by a given business integration service through various adaptors. For example, business integration service 122 may access applications 126 and 130 through adaptors 124 and 128, respectively. In addition, the business application service 102 may access the business integration shared workspace 114. This business integration shared workspace 114 may be coupled with data 116, process states 120 and rules 118. In this manner, data 116, process states 120, and rules 118 may be served or applied from a business integration service tier without accessing a remote resource application.

The business application service 102 may, for example, provide billing, fulfillment, and customer assurance functionality to various access interfaces. These functionalities are achieved by accessing the business integration services 108 and 122 and the business integration shared workspace 114. For example, an integrated billing service may be accomplished through a business application service 102 accessing a business integrated service 122, which acquires usage data from various subscriber systems, such as applications 126 and 130. In another example, address verification may be retrieved by a single business integration service 108 accessing a resource application 112 associated with the requested address. Business application service 102 functionality is achieved through interaction with one or more business integration services and the business integration services shared workspace, each having access to various combinations of applications, data, rules, and process states.

In general, users utilizing a variety of communications, protocols and methods access the business application service 102. The business application service 102 accesses an appropriate business integration service or business integration shared workspace to acquire data or to perform a function. The business integration service or business integration shared workspace accesses data in remote distributed systems to provide the desired functionality. In this manner, a common applications interface may be provided through the business application service 102 while functionality is performed on a variety of remote and diverse resource systems and applications 112, 126 and 130 and through a shared workspace 114.

Figure 2:
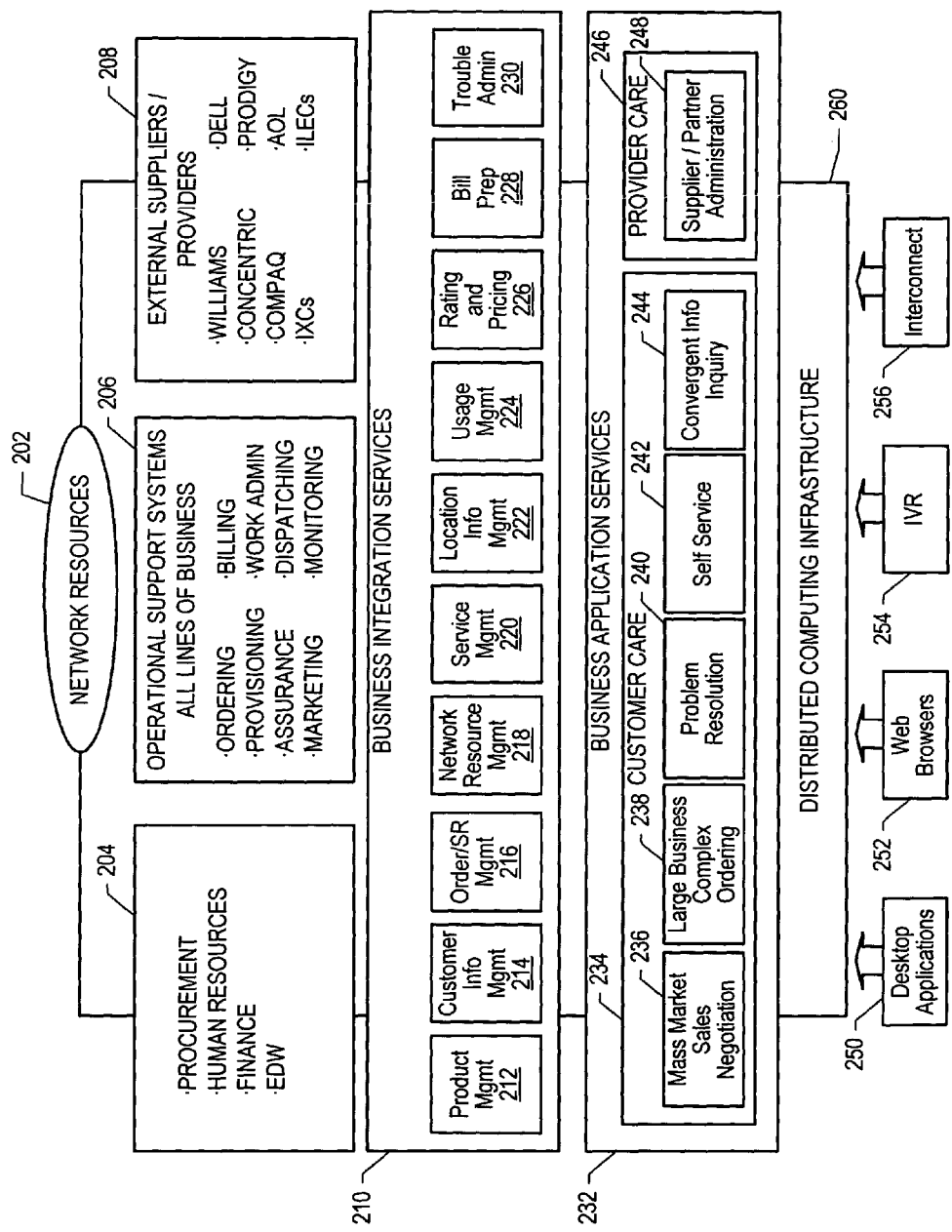

FIG. 2 depicts a further embodiment of an enterprise integration architecture. In this architecture, a variety of access methods are provided to diverse management and support systems. Access methods, such as desktop applications 250, web browsers 252, IVRs 254, and interconnection services 256 communicate to business application services 232. The business application services 232 access business integration services 210 that in turn access a variety of diverse business management systems 204, operational support systems 206, and external suppliers and providers 208. In this manner, diverse access systems may influence the functionality of diverse resource systems and interfaces.

The business application services 232 may be performed by one or more computational systems or servers. The business application services 232 may include customer care services 234 and provider care services 246. The customer care services 234 may include mass market sales negotiation 236, large business complex ordering 238, problem resolution 240, self-service 242, and a convergent information inquiry 244. The provider care services 246 may include supplier or partner administration services 248. The business application services 232 may function to control workflow processes and manage sessions and states. The business application services 232 may provide such functionality by accessing business integration services 210.

The business integration services 210 may be performed by one or more computational systems or servers. The business integration services 210 may manage and execute tasks and provide stateless business functions. This management and task execution may include providing interfaces, system integration, translation, coordination, scheduling, notification, caching, staging, and metadata repositories. Exemplary embodiments of the business integration services 210 include product management 212, customer information management 214, order/service request management 216, network resource management 218, service management 220, location information management 222, usage management 224, rating and pricing 226, bill preparation 228, and trouble administration 230. These business integration services 210 may function to access diverse resource systems and interfaces through the shared distributed computing infrastructure 260. For example, the business integration services 210 may access business management systems 204. These business management systems 204 may include procurement, human resources, finances, and enterprise data warehouse (EDW) functionality. In some embodiments, the business management systems 204 may take the form of legacy database systems, such as SAP or Oracle, among other similar systems. The business integration services 210 may also access operational support systems 206 through the shared distributed computing infrastructure 260. These operational support systems 206 may include ordering, provisioning, assurance, marketing, billing, work administration, dispatching, and monitoring functions. Further, the business integration services 210 may access external suppliers and providers 208 through the shared distributed computing infrastructure 260. These external suppliers and providers may include long distance companies, network resource suppliers, equipment suppliers, exchanges, and LECs, among others.

The shared distributed computing infrastructure 260 may include shared infrastructure functions such as communications management, directory control, infrastructure management, security, and interconnection services. This infrastructure may be implemented using screen scraping such as SNA LU2, application peer-to-peer communications such as SNA-LU 6.2, IBM MQ Series, TCP/IP socket level programming, and other standard interfaces, such as CORBA, JAVA RMI/IIOP, JMS, JDBC, and message-oriented middleware. The network resources 202 may include network equipment such as switches, routers, connections, and remote terminals.

In one exemplary embodiment, a consumer may access a system through a web browser 252. The web browser may direct communication with the business application services 232 such as the consumer care services 234 (e.g. self service 242). This customer care module 234 may then access a business integration services module, such as the customer information management module 214. The customer information management module 214 may selectively communicate with a business management system 204. Using such a communications path, a consumer may change their associated customer information. In this manner, consumers located in differing geographic regions may access a common website to change information on diverse resource systems.

In another example, a competitive local exchange carrier (CLEC) may access a business application service 232 through an interconnection service 256. The CLEC may attempt to validate an address or facilitate a channel facility assignment. The business application service 232 may then access a module associated with the business integration service 210, such as the location information management module 222 or the network resource management module 218. The business integration service 210 may then access the business management systems 204 or the operational support systems 206 to facilitate the data transfer or functionality sought by the CLEC. In general, various examples can be envisioned that show a diverse set of access points and protocols accessing a diverse set of resource systems and interfaces to provide a common set of application services.

Figure 3:
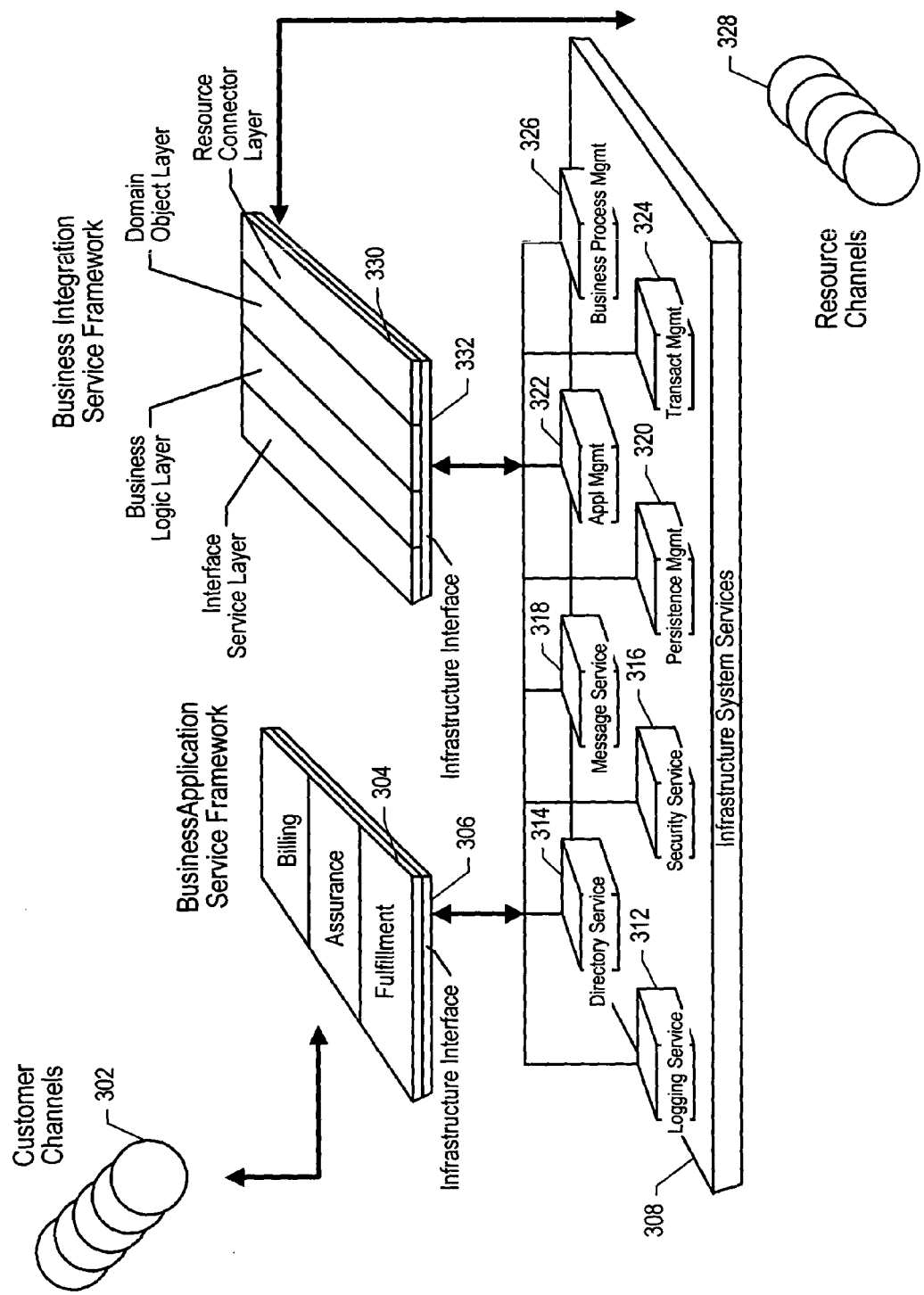

FIG. 3 depicts a further exemplary embodiment of an enterprise integration architecture. In this exemplary embodiment, various customer channels 302 access a business application framework 304. This business application services framework 304 has infrastructure interfaces 306. These infrastructure interfaces 306 access the infrastructure system services 308. The business application services framework 304 may provide various functionality including billing, assurance and fulfillment.

The infrastructure system services 308 provide the mechanisms and adaptations to enable information exchange. The infrastructure system services 308 may include industry standard internet protocols and services, such as CORBA, Jini, and HTTP; interface and data representations, such as XML, and IDL; integration enabling tools; adaptation design patterns; and naming services. The infrastructure system services 308 may include various functional modules such as logging services 312, directory services 314, security services 316, message services 318, persistence management services 320, application management services 322, transactional management services 324, and business process management services 326.

The infrastructure system services 308 may provide an application management service 322 such as a software management capability. This capability may permit operation, administration, and maintenance capabilities. The infrastructure system services 308 may also provide a configuration policy rules interface. The process management services 326 may provide a common rules repository for workflow and policy behavior. The security services 316 may apply common security policies across all layers and modules. For example, the permissions of initiators of object invocation may be validated prior to execution. The logging services 312 may log communication between various modules. For example, requests and responses from the business application service and business integration service systems may be logged by logging services 312. Persistence management services 320 may control the caching of objects. Messaging services 318 may utilize messaging standards such as Java Messaging Services (JMS) to provide synchronous, asynchronous, point-to-point, and publish/subscribe messaging. Caching services may be used to improve processing time and data recovery, and to provide temporary persistence containers. Directory services 314 may be used for looking up distributed service registrations and may permit federation of nane spaces across numerous software and hardware platforms. The infrastructure system services 308 may also have infrastructure interfaces for providing common access specifications.

The business application services framework 304 and the infrastructure systems services 308 may access a business integration services framework 330 through an infrastructure interface 332. The business integration service framework 330 may include multi-layered logic. This multi-layered logic may include an interface services layer, a business logic layer, a domain object layer, and a resource connector layer. Through these layers, the business integration service framework 330 may connect with and interact with multiple diverse and distributed resource channels 328. With such a system, distributed and diverse customer channels 302 may access a common application services framework 304. This framework 304 may take advantage of reusable infrastructure systems services 308 and the common business integration services framework 330 to facilitate communication with various distributed and diverse resources 328. For example, various CLECs may optionally access billing information through a variety of proprietary or standard protocols. The billing information can be retrieved from diverse resource channels 328 through common reusable infrastructure systems and frameworks.

Figure 4:
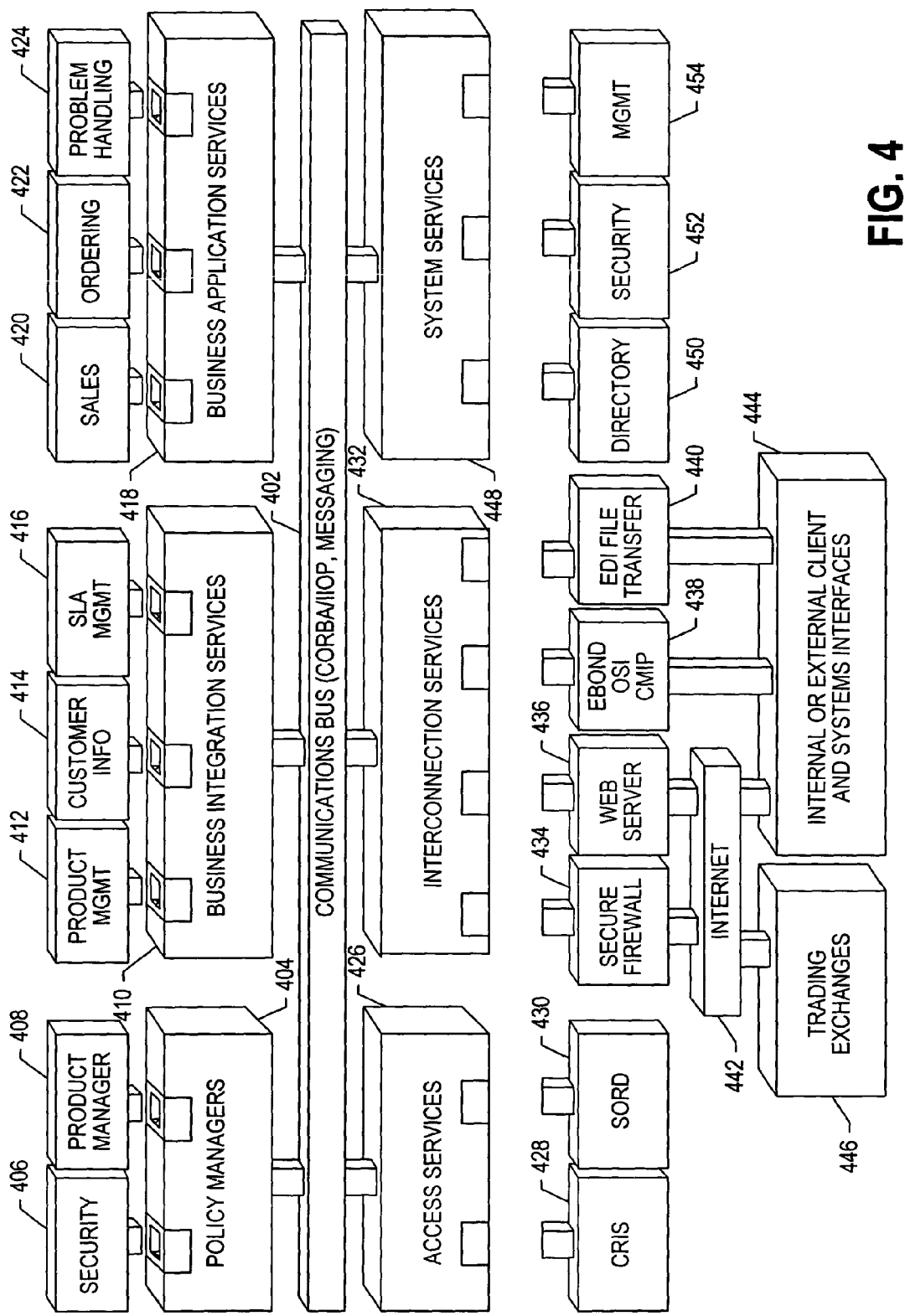

FIG. 4 depicts another exemplary embodiment of an enterprise integration architecture. Interconnection services 432 connect to a common communications bus 402 to provide access to business application services 418. These business application services 418 in turn access the same communications bus 402 to provide access to the business integration services 410. In addition, various policy managers 404, access services 426, and system services 448 may access the common communications bus 402.

The common communications bus 402 may provide various functionality that conforms to communications standards such as CORBA/IIOP, Java RMI/IIOP, JMS, JDBC, and other message-oriented middleware.

The interconnection services 432 provide access to various interfaces, customers, and consumers. For example, trading exchanges 446 and internal or external clients and system interfaces 444 may access the interconnection services 432 through various means. These clients 446 and 444 may access a secured firewall 434 or a web server 436 through the Internet 442. In another embodiment, the client and system interfaces 444 may access the interconnection services 432 through an EBOND open system interconnect (OSI) common management information protocol (CMIP) system 438, CORBA, or an electronic document interchange (EDI) file transfer system 440. Through these access means 434, 436, 438, and 440, the clients 444 and exchanges 446 may access the functionality of the business application services 418 by connecting with the common communications bus 402 through the interconnections services 432.

The business application services 418 may include services such as sales modules 420, ordering modules 422, and problem handling modules 424. These modules may provide a common interface to clients and customers for accessing diverse resource systems. The business application services 418 may access the business integration services 410 through the common communications bus 402.

The business integration services 410 provide access to modules such as product management 412, customer information management 414, and service level agreement management 416. The business integration services 410 may, in turn, access the access services 426 to provide access to resource systems, such as CRIS 428 and service order retrieval distribution (SORD) 430 modules, among other diverse and distributed resource systems.

In addition, various other services and systems may access the common communications bus 402. These systems may function to manage the common communications bus or the other component systems. For example, policy management systems 404 may connect to the communications bus 402. A policy management system 404 may include security systems 406 and product manager systems 408. The system services systems 448 may provide access to the communications bus 402, to directory systems 450, security systems 452, and management systems 454.

Figure 5:
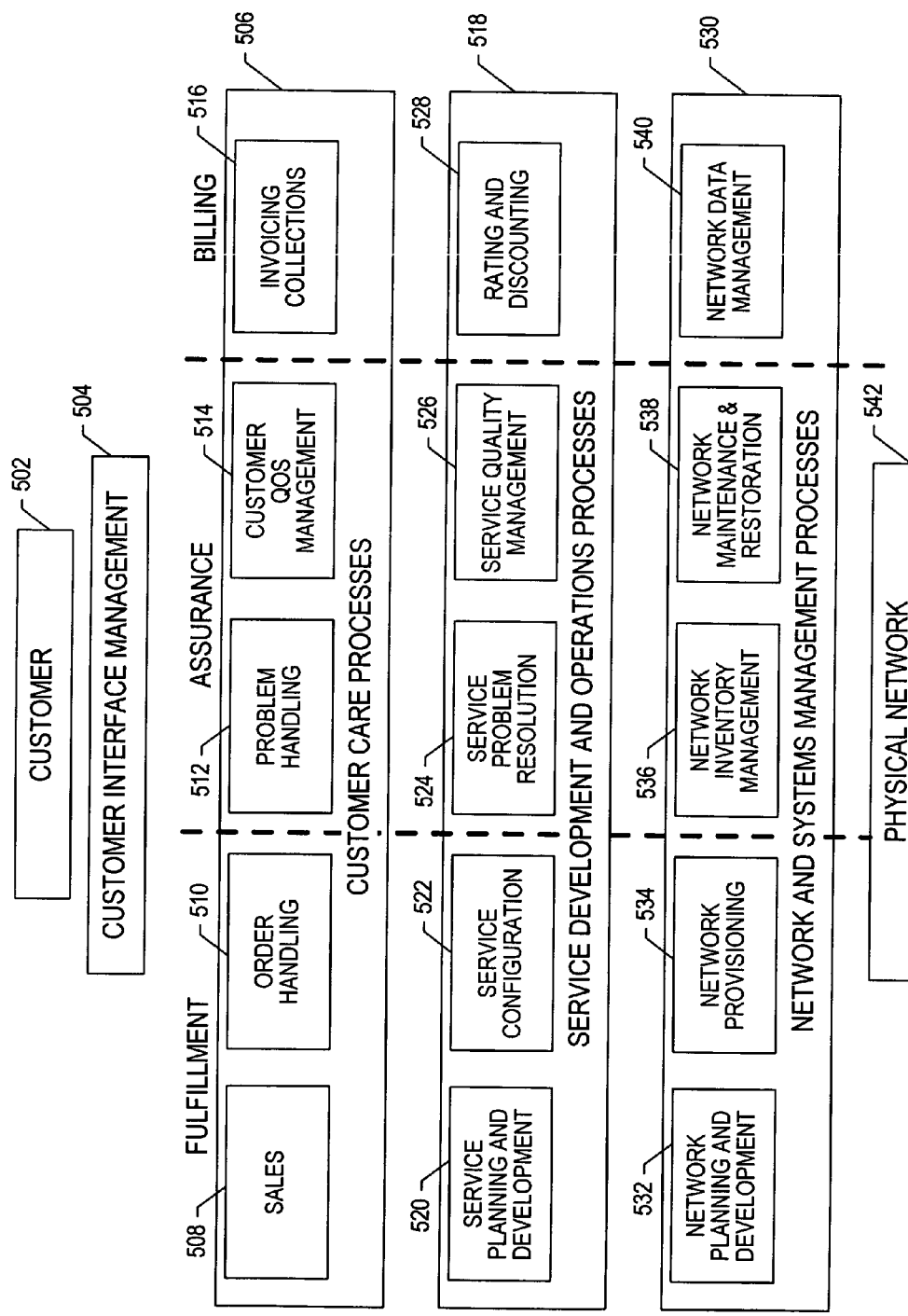
FIG. 5 depicts an exemplary embodiment of a business application service.

FIG. 5 depicts an exemplary business application service that has been adapted from the framework published by the Telemanagement Forum as the Telecom Operations Map (TOM). The eTOM may also be implemented as a business application service. The TMF/TOM and eTOM are business process models that are useful as a framework for standardization.

In FIG. 5, a customer or client 502 may interact with the framework through a customer interface management system 504. The framework provides for three broad categories of functionality, including fulfillment, assurance, and billing. These broad functionality areas are arranged in levels such as customer care processes 506, service development and operations processes 518, and network and system management processes 530. For example, fulfillment functionality may be arranged in terms of sales modules 508 and order handling modules 510 arranged in the customer care processes level 506. Services planning and development modules 520 and service configuration modules 522 are arranged in the service development and operations processes level 518, and network planning and development modules 532 and network provisioning modules 534 are arranged in the network and system management processes 530.

Similarly, assurance functionality may be provided using problem handling modules 512 and customer QOS management 514 in the customer care processes level 506; service problem resolution module 524 and service quality management 526 in the service development and operations processes level 518; and network inventory management 536 and network maintenance and restoration module 538 in the network and systems management processes level 530. Billing functionality may be provided through invoice collection modules 516 in the customer care processes level 506; rating and discounting modules 528 in the services development and operations processes level 518, and network data management module 540 in the network and systems management processes level 530. Through these high-level business application service modules, more specific process flows can be identified. Through these specific process flows, the business application services may access the physical network 542. For example, various modules may access a business integration services system.

With an application service including the example described above, an interface for federated access to customer data may be provided. This federated access may aggregate and manage customer data from diverse resource systems. The customer data may include personal customer information, usage data, subscription service data, service request data, address data, and telephone number data, among others. For example, the federated access may result in an aggregate bill including charges for several diverse communications services and products.

Figure 6:
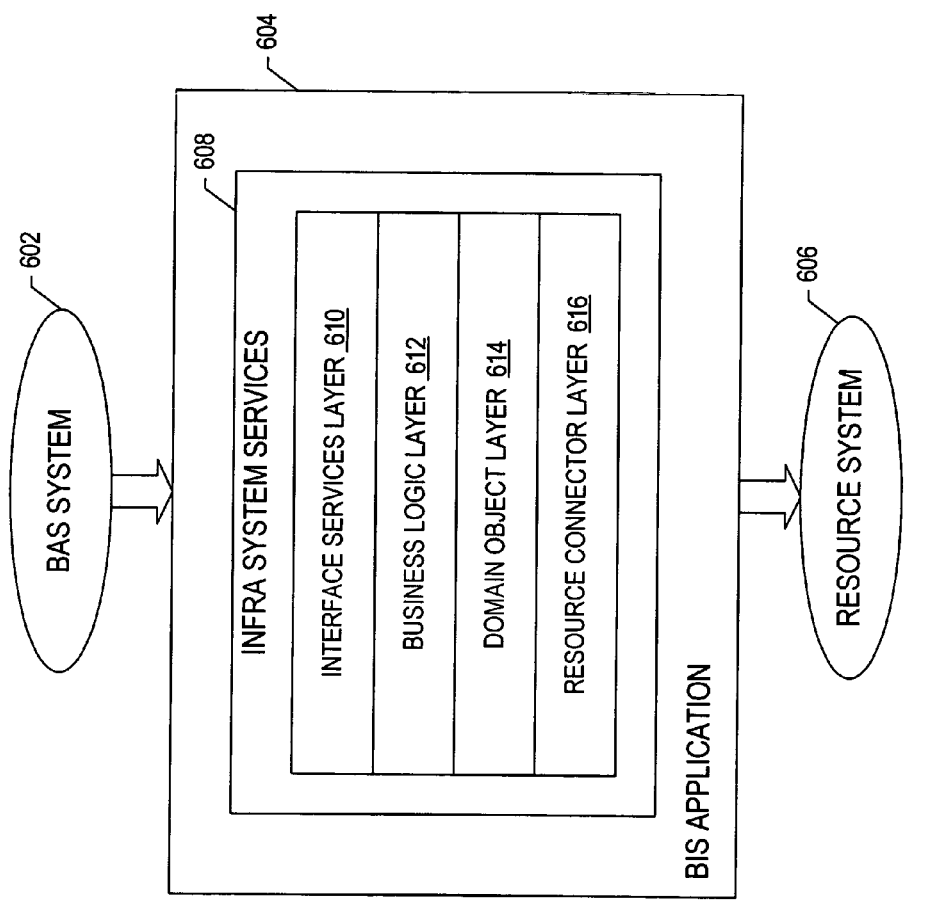
FIGS. 6, 7, 8, and 9 depict exemplary embodiments of a business integration service.

FIG. 6 depicts an exemplary embodiment of a business integration service application. The business integration services application 604 may reside on one or more servers and acts as an intermediary system between the business application services system 602 and the resource system 606. In this exemplary embodiment, the business integration services application 604 includes a layered architecture integrated through infra system services 608.

The layered structure may include an interface services layer 610, a business logic layer 612, a domain object layer 614, and a resource connector layer 616. Each layer may be instantiated multiple times. The interface services layer 610 may provide interfaces to systems such as business application services system 602.

Communications from the business application services system 602 are received and directed to the business logic layer 612. The business logic layer 612 provides business logic to control the flow and enforcement of enterprise business rules and policies for the business integration services. This business logic may be separated from the knowledge of the resource systems through domain objects. The business logic layer 612 accesses the domain object layer 614 to instantiate domain objects, which in turn may access resource system 606 through the resource connection layer 616. The domain object layer 614 integrates data from various resources into the business logic layer functionality. The domain object layer 614 may access data on resource systems through the resource connector layer 616. In this manner, the domain object layer 614 may integrate and manipulate data without detailed knowledge of the resource interface systems. The resource connector layer 616 connects and interfaces with diverse resource systems using various translators, connectors, and parsers.

Figure 7:
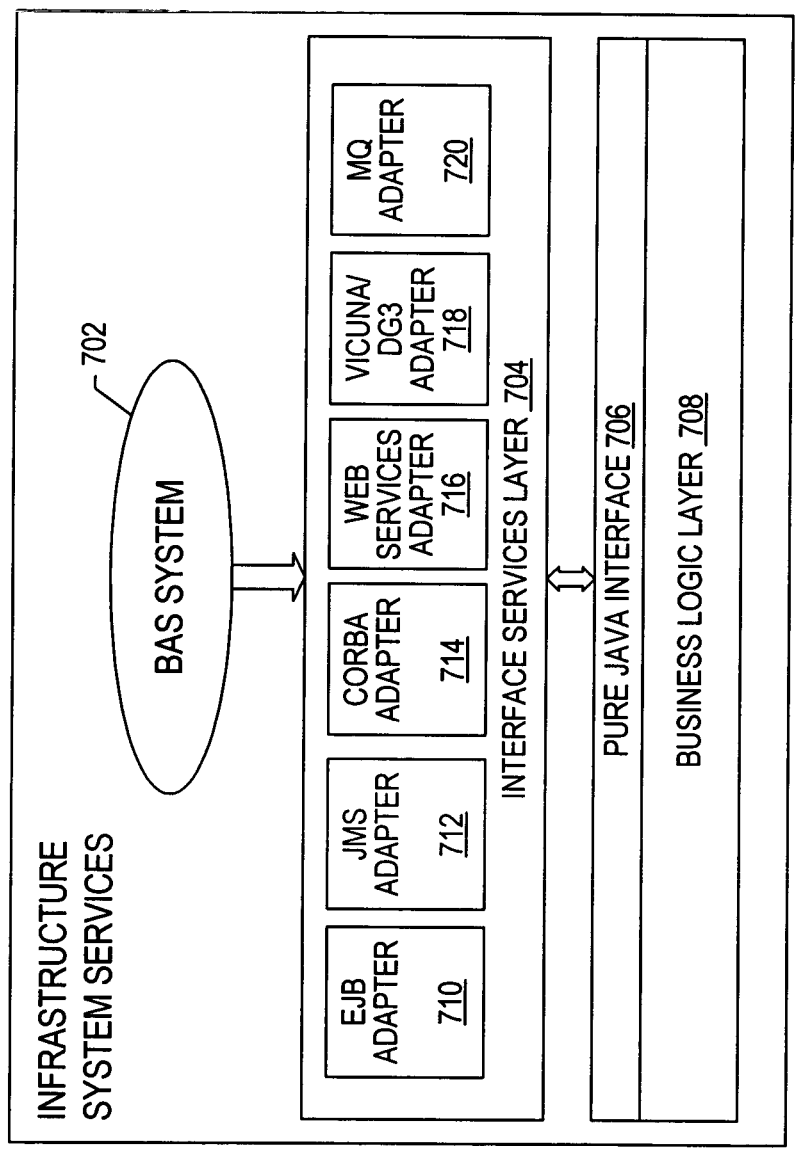

FIG. 7 depicts an expanded interface services layer 704. The interface services layer 704 interacts with the business application services system 702 through various adaptors. These adaptors may include Enterprise Java Bean (EJB) adaptor 710, Java Messaging Service (JMS) adaptor 712, Common Object Request Broker Architecture (CORBA) adaptor 714, web services adaptor 716, internal middleware adaptor 718, and IBM® Message Queue (MQ) Series adaptor 720, among other adaptors. With these adaptors, the integration services layer may integrate with the business application services system 702 and a Java interface 706 associated with the business logic layer 708.

Figure 8:
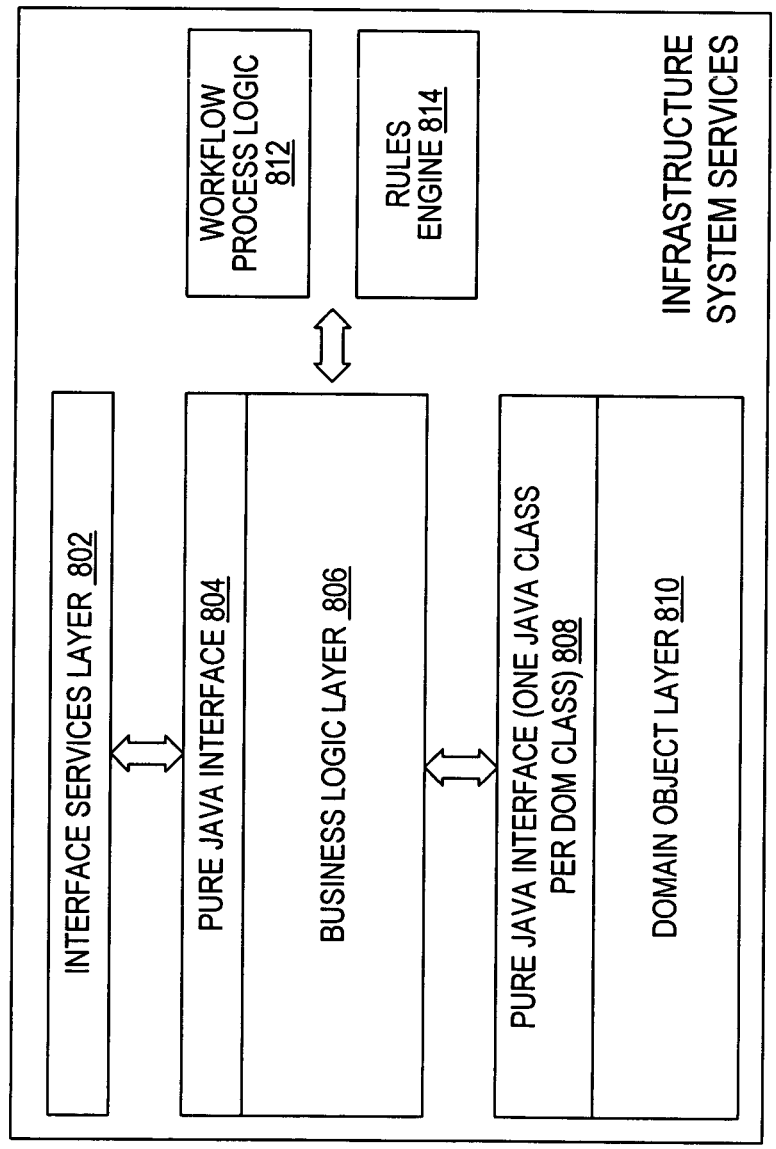

FIG. 8 depicts an illustrative business logic layer 806. The business logic layer 806 provides business logic that controls process flow and enforces enterprise business rules and policies. The business logic layer 806 interacts with the interface services layer 802 through an interface 804 and, also, interacts with the domain object layer 810 through an interface 808. The business logic layer 806 may also interact with workflow process logic 812 and a rules engine 814. The business logic layer 806 may provide various functionality including product management, customer information management, order management, network resource management, service management, location information management, usage management, rating and pricing, bill preparation, and trouble administration. The business logic layer 806 may use a common identity or access key provided by the business application service.

Figure 9:
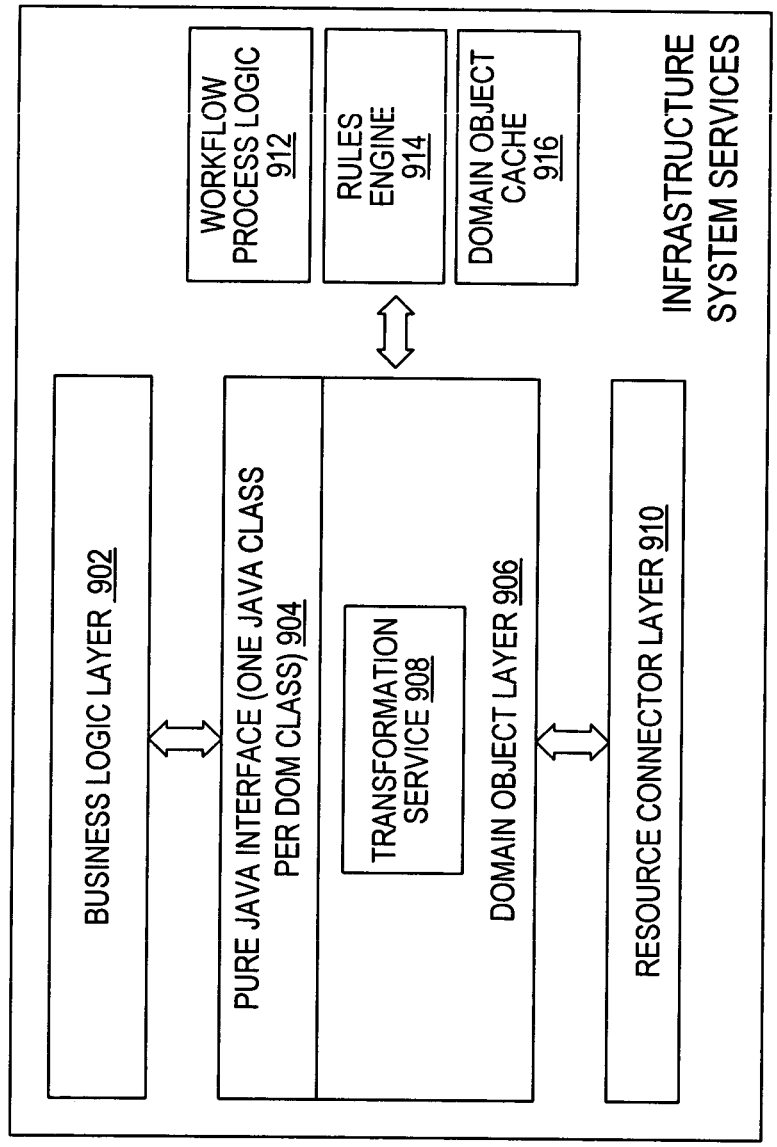

FIG. 9 depicts an illustrative domain object layer 906. The domain object layer 906 provides instances of domain objects to the business logic layer 902 and interacts with the business logic layer 902 through an interface 904. The domain object layer 906 also interacts with the resource connector layer 910. The domain object layer 906 may include a transformation service 908 that transforms the information that is stored in various resource systems into data object instances. A resource connection layer may access and translate data via resource connectors. This data may be provided to the domain object layer 906 for transformation into domain objects. In addition, the domain object layer 906 may interact with workflow process logic 912, rules engine 914 and domain object cache 916. For example, the process logic 912, rules associated with the rules engine 914, and management of domain object cache 916 may be influenced by the instances of the domain objects. The workflow process logic 912 and rules engine 914 may, in turn, influence the actions of the business logic layer 902.

To create a domain object, the domain object layer 906 determines the resource system transactions that may be used to create a requested domain object. In part, the domain object layer 906 may be directed by drivers or controllers in the business logic layer 902. Then, the domain object layer 906 requests the resource connection layer 910 to perform the resource system transactions. The domain object layer 906 translates the results of the resource system transactions into domain objects. The domain object layer 910 may use the common identity or access key provided by the business application service when communicating with the resource connector layer 910.

Persistence of domain objects may be utilized through the domain object cache 916. Domain objects may be cached as requested or pre-fetched according to rules and policies. These rules and policies may also be tuned at runtime to enhance performance.

Figure 10:
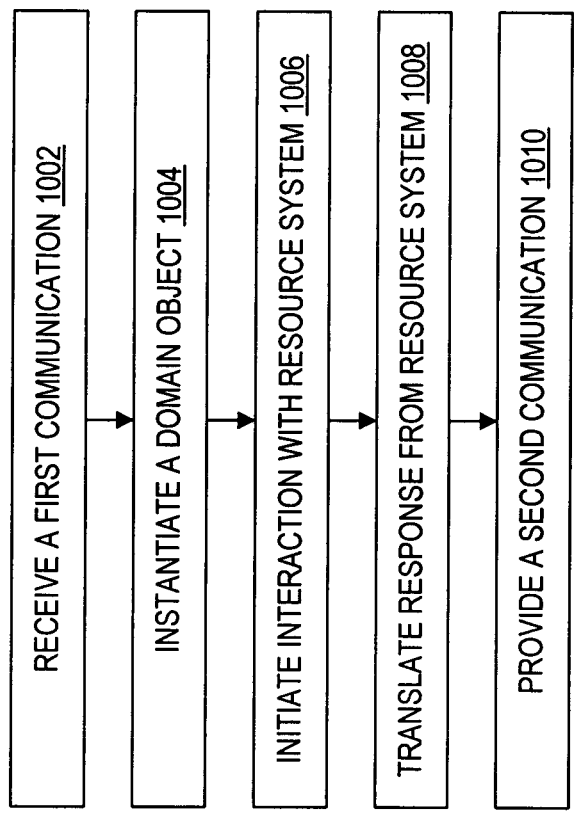
FIG. 10 depicts an exemplary method for domain object usage.

FIG. 10 depicts an illustrative method for creating and using a domain object. A first communication is received, at step 1002. This first communication may, for example, be a request for an address validation, a channel facility assignment request, a telephone number inquiry, a telephone number cancellation, a telephone number reservation, an information request, or a transaction request. A domain object is instantiated, at step 1004. Then, interaction is initiated with a resource system, at step 1006. The resource systems may, for example, be a PREMIS, ASON, or TIRKS® system. In the event that a response is provided by the resource system, the response is transformed into the domain object, at step 1008. The system, then, provides a second communication, at step 1010. This second communication may be sent to a business application service and provided to a requester.

Figure 11:
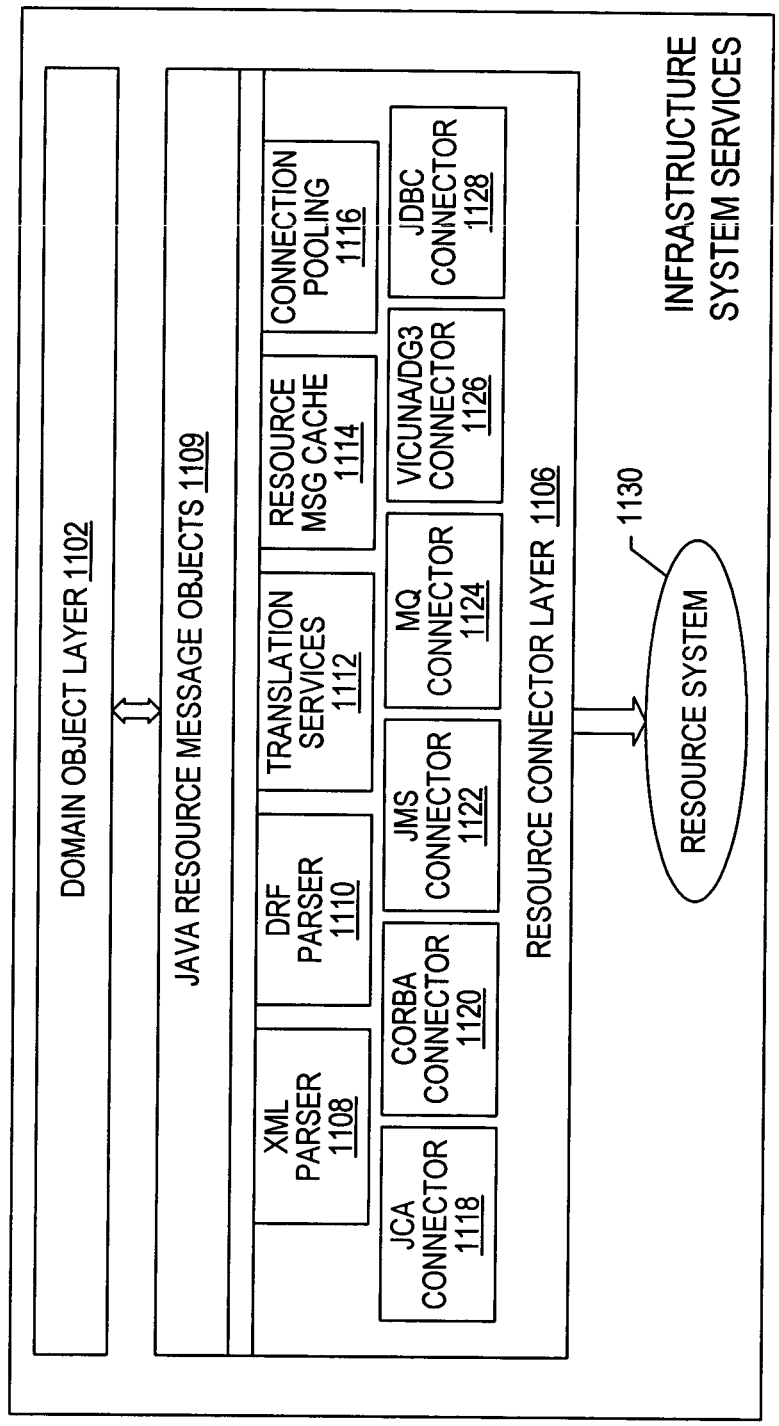
FIG. 11 depicts an exemplary embodiment of a business integration service.

FIG. 11 depicts an expanded resource connector layer 1106. The resource connector layer 1106 communicates with the domain object layer 1102 through a Java resource message object 1109. The resource connector layer 1106 includes connectors, parsers and services, such as XML parser 1108, data representation format (DRF) parser 1110, translation services 1112, resource message cache 1114, connection pooling 1116, Java Connection Architecture (JCA) connector 1118, CORBA connector 1120, JMS connector 1122, IBM® MQ Series connector 1124, internal middleware connector 1126, and JDBC connector 1128. Through the resource connector layer 1106, the domain object layer 1102 may communicate with the diverse resource systems 1130.

For example, the resource connector layer 1106 may receive a request from the domain object layer 1102. The resource connector layer 1106 may, then, connect to resource systems to facilitate a transaction. The results of the transaction are then translated into a fielded response. The transaction results are then provided to the domain object layer 1102.

To integrate a resource system into the architecture, an adaptor or connector may be coupled to or given access to the resource system. The adaptor or connector may also be coupled to a resource channel of the distributed computing system or business integration service. In this manner, legacy systems, diverse operational support systems, diverse billing support systems, and diverse facility systems may be integrated into the enterprise infrastructure. Such integration may be useful when merging or acquiring telecommunication related companies serving diverse regions or offering diverse services.

Figure 12:
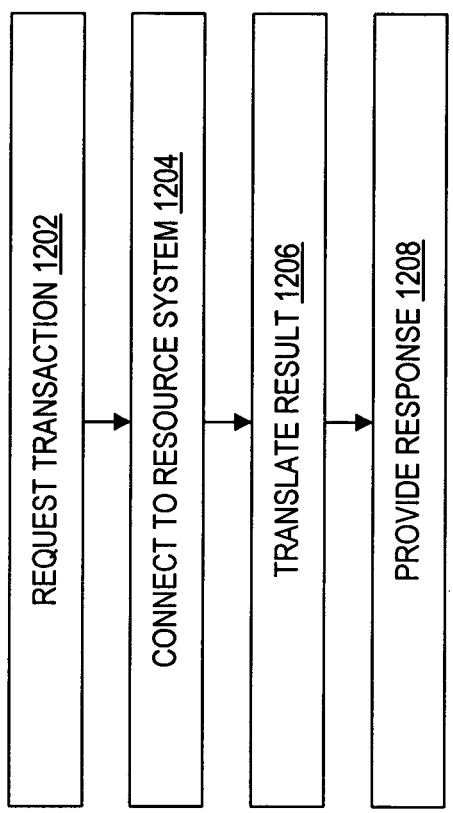
FIG. 12 depicts an exemplary method for resource system access.

FIG. 12 depicts an exemplary method for use by the resource layer. A domain object may request data or a transaction. In response to a request, the resource layer may request a transaction, at step 1202. The transaction may be a database query, facility assignment, or resource allocation, among others. The resource layer connects to the resource system, at step 1204. A response or result from the resource system or transaction may be translated, at a step 1206. For example, the response may be translated into fielded data. The translated response may then be provided to the domain object or other layers of the business integration service, at a step 1208.

Figure 13:
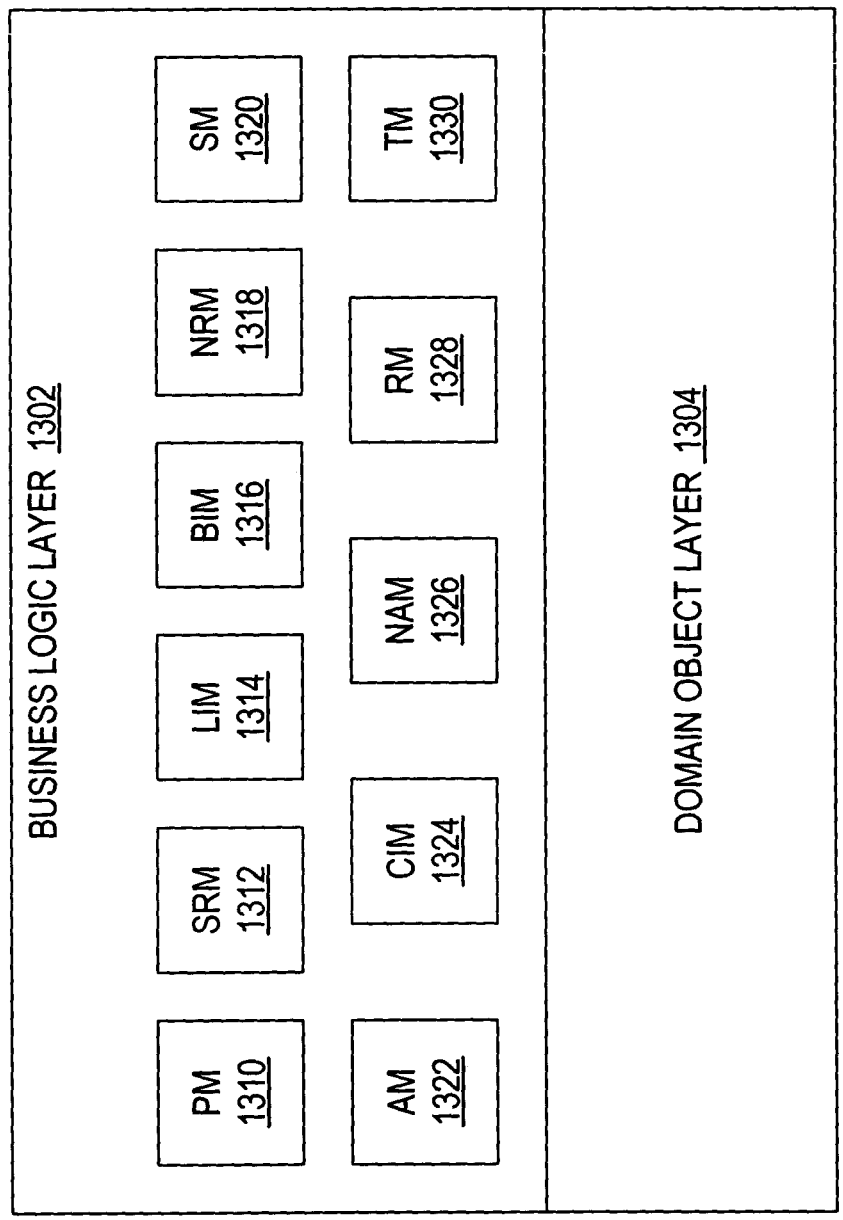
FIGS. 13 and 14 depict exemplary embodiments of a business integration service.

FIG. 13 depicts a further example of the layered business integration service system. A business logic layer 1302 is coupled to a domain object layer 1304. The business logic layer 1302 includes functional modules such as product management (PM) 1310, service resource management (SRM) 1312, location information management (LIM) 1314, billing information management (BIM) 1316, network resource management (NRM) 1318, service management (SM) 1320, availability management (AM) 1322, customer information management (CIM) 1324, network address management (NAM) 1326, resource management (RM) 1328, and trouble management (TM) 1330. The product management module 1310 integrates product information into the enterprise. The service request management module 1312 integrates service request information into the enterprise. The location information management module 1314 integrates location information into the enterprise. The billing information management module 1316 integrates billing information into the enterprise. The network resource management module 1318 integrates network resource information into the enterprise. This network resource management module 1318 may have similar functions to the network address management module 1326 and resource management module 1328. The service management module 1320 integrates service information into the enterprise. The availability management module 1322 integrates product feature and service availability information into the enterprise. The customer information management module 1324 integrates customer information into the enterprise. The network address management 1326 integrates network address information into the enterprise. The resource management module 1328 integrates network resource information into the enterprise. The trouble management module 1330 integrates trouble report information into the enterprise. These modules function along with the business logic layer 1302 to determine what data to gather or action to facilitate in response to communication from a business application service. The business logic layer 1302 and its modules instantiate objects associated with the domain object layer 1304. The domain object layer 1304 then accesses resource connections to acquire the requested data or facilitate the desired action. Information or results may then be transferred back through the domain object layer 1304 to the business logic layer 1302 and out to the requesting business application service system.

Figure 14:
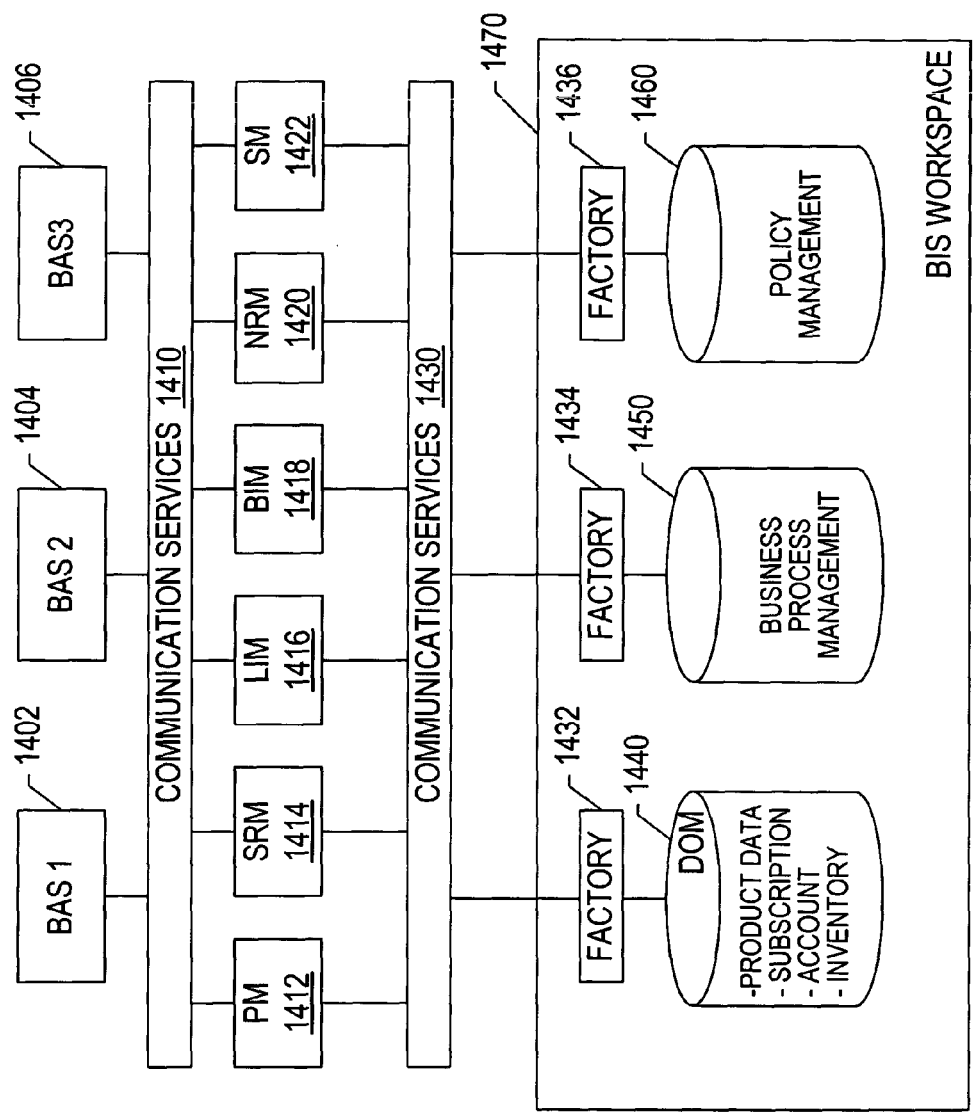

FIG. 14 represents operation of an exemplary business integration services system in action in response to various business application services events. The business integration services system provides business logic and resource interaction. Events such as BAS 1 1402, BAS 2 1404, and BAS 3 1406 are communicated through the communication services 1410 to various business logic modules such as product management 1412, service request management 1414, location information management 1414, billing information management 1418, network resource management 1420 and service management 1422. These business logic modules determine what information or action is needed in response to the business application services event. These modules then communicate through a communications service 1430 to a business integration services workspace 1470. This business integration services workspace 1470 may be organized into various factory elements. For example, factory elements 1432, 1434, and 1436 are connected to domain object models 1440, business process management 1450 and policy management 1460, respectively. The business logic modules may, using a domain object, access product data, subscription data, accounting, and inventory data, among others. In addition, the systems may access business process management 1450 or policy management 1460. In this manner, any one business logic module may access one or more of the logical factories 1432, 1434, and 1436 to perform the desired action or to acquire the requested data.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A distributed computer system for use in connection with telecommunications operational support, the distributed computer system comprising:
   a common integration communication bus;
   a business integration service application residing on one or more servers, the business integration service application to issue a request for a service from an integration services module and to provide one of a billing functionality, a fulfillment functionality, a customer assurance functionality, customer care services and provider care services;
   an adapter module responsive to the business integration service application, the adapter module coupled to the common integration communication bus and adapted to transmit the request received from the business integrated service application to the common integration communication bus; and
   wherein the integration services module is coupled to the common integration communication bus, and wherein the integration services module is adapted to receive the request from the common integration communication bus to provide the service.

2. The distributed computer system of claim 1, further comprising an integrated services module adapter coupled to the integration services module and an integrated services software application accessible to the integrated services module via the integrated services module adapter.

3. The distributed computer system of claim 2, wherein the business application is loaded onto a first hardware element and the integration services software application is loaded onto a second hardware element, the first hardware element located remotely from the second hardware element.

4. The distributed computer system of claim 1, further comprising a second integration services module coupled to the common integration communication bus, a first integrated services application coupled to the second integration services module via a first adapter, and a second integrated services application coupled to the second integration services module via a second adapter.

5. The distributed computer system of claim 1, further comprising art integration services shared workspace element comprising a server system, wherein the integration services shared workspace element includes shared data, processing rules, and process state information.

6. The distributed computer system of claim 5, wherein the integration services shared workspace element comprises a domain object manager, a business process manager, and a policy manager.

7. The distributed computer system of claim 1, wherein the requested service comprises: acquiring data or a function result obtained from performing a function selected from the group consisting of product management, service management, location information management, usage management, rating, and pricing, bill preparation, trouble administration, customer information management, order/service request management, network resource management, and location information management; and
relaying the acquired data or the function result to the business integrated service application.

8. A distributed computing system comprising:
a plurality of channel access interface coupled via a common integration communication bus;
an application service framework coupled to the plurality of channel access interfaces, the application services framework adapted to provide one of billing functionality, fulfillment functionality, and customer assurance functionality to one of the plurality of channel access interfaces, the application services framework having a first distributed interface;
a common integration services framework comprising one or more servers, and including a plurality of shared layered integration services adapted to provide a plurality of shared services to the application services framework, the common integration services framework having a second distributed infrastructure interface; and
a distributed infrastructure system having a plurality of distributed networked computing elements, wherein the distributed infrastructure system is communicatively coupled to the first distributed infrastructure interface and to the second distributed infrastructure interface.

9. The distributed computing system of claim 8, wherein the plurality of shared services comprises:
acquiring dam or a function result Obtained from performing a function selected from the group consisting of product management, service management, location information management, usage management, rating and pricing, bill preparation, trouble administration, customer information management, order/service request management, network resource management, and location information management; and
relaying the acquired data or the function result to a business application.

10. The distributed computing system of claim 8, wherein the plurality of distributed networked computing elements comprises a data logging service, a directory service, a security service, a messaging service, a persistence management service, an application management service, a transaction management service, and a business process management service.

11. The distributed computing system of claim 8, further comprising a plurality of resource channels to communicate with telecommunication network resources and to provide data or functionality to the common integration services framework.

12. The distributed computing system of claim 8, where one of the plurality of shared layered integration services includes;
an interface service layer adapted to provide an interface to the application services framework;
a business logic layer adapted to provide business logic to control flow and enforcement of enterprise business rules and policies applied to domain objects;
a domain object layer adapted to instantiate the domain objects; and
a resource connector layer adapted to provide data retrieved from resources to the domain object layer via the domain objects.

13. The distributed computing system of claim 12, wherein the interface services layer comprises a first adapter for interfacing with the application services framework and communicating with a second JAVA type interface.

14. The distributed computing system of claim 12, wherein the business logic layer comprises a first JAVA type interface and a plurality of business logic modules, the plurality of business logic modules, having access to a second JAVA type interface of the domain object layer.

15. The distributed computing system of claim 12, wherein the domain object layer comprises a JAVA type interface and performs a translation service with the resource connector layer.

16. The distributed computing system of claim 12, wherein the resource connector layer comprises a plurality of JAVA resource message objects operable for communication with a plurality of resource systems.

17. The distributed computing system of claim 8, wherein the plurality of channel access interfaces are accessible by customers and third party local exchange carders.

18. The distributed computing system of claim 8 further comprising a plurality of resource access interfaces.

19. The distributed computing system of claim 18, wherein the plurality of resource access interfaces access a plurality of service providers.

20. The distributed computing system of claim 19, wherein the plurality of services providers include alliance partners, local exchange carriers, long distance carriers, and equipment suppliers.

21. A distributed computing system comprising: a plurality of customer channel access interfaces coupled via a common integration communication bus;
an application services framework Coupled to the plurality of customer channel access interfaces, the application services framework including billing functionality, fulfillment functionality, and customer assurance functionality, the application services framework having a first distributed infrastructure interface and adapted to provide at least one of billing functionality, fulfillment functionality, and customer assurance functionality to at least one of the plurality of customer channel access interfaces;

a common integration services framework including a plurality of shared layered integration services, the common integration services framework adapted to provide a service to the application services framework, the common integration services framework having a second distributed infrastructure interface;

a distributed infrastructure system having a plurality of distributed networked computing elements, the distributed infrastructure system responsive to the first distributed infrastructure interface and to the second distributed infrastructure interface; and a plurality of resource channels to communicate with telecommunication network resources and to provide data to the common integration services framework, wherein the telecommunication network resources are a legacy system having a proprietary interface and an adapter to allow the legacy system to be accessed via at least one of the resource channels.

22. The distributed computing system claim 21, wherein the service comprises:

acquiring data or a function result obtained from performing a function selected from the group consisting of product management service management, location information management, usage management, rating and pricing, bill preparation, trouble administration, customer information management, order/service request management, network resource management, and location information management; and relaying the acquired data or the function result to a business application.

\* \* \* \* \*